United States Patent
Kadoya et al.

(10) Patent No.: US 8,693,784 B2
(45) Date of Patent: Apr. 8, 2014

(54) EYELID DETECTION DEVICE AND PROGRAM

(75) Inventors: Akira Kadoya, Kitanagoya (JP); Satoru Nakanishi, Nagoya (JP); Shinichi Kojima, Seto (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/805,597

(22) PCT Filed: Jul. 6, 2011

(86) PCT No.: PCT/JP2011/065509
§ 371 (c)(1),
(2), (4) Date: Dec. 19, 2012

(87) PCT Pub. No.: WO2012/008345
PCT Pub. Date: Jan. 19, 2012

(65) Prior Publication Data
US 2013/0101225 A1    Apr. 25, 2013

(30) Foreign Application Priority Data

Jul. 14, 2010    (JP) .................. 2010-160053

(51) Int. Cl.
*G06K 9/48* (2006.01)
*G06K 9/46* (2006.01)
*G06K 9/40* (2006.01)
*G06K 9/00* (2006.01)

(52) U.S. Cl.
USPC ............ 382/199; 382/255; 382/117; 382/195

(58) Field of Classification Search
CPC ............. G06K 9/48; G06K 9/00; G06K 9/40; G06K 9/46
USPC ...................... 382/199, 117, 255, 195; 348/78
See application file for complete search history.

(56) References Cited

U.S. PATENT DOCUMENTS 5,432,866 A    7/1995  Sakamoto
5,657,109 A *  8/1997  Konishi .................... 351/211
(Continued)

FOREIGN PATENT DOCUMENTS

JP    6-078901 A    3/1994
JP    3-143819 B2   3/2001
(Continued)

OTHER PUBLICATIONS

NPL—E.M. Arvacheh, H.R. Tizhoosh, "Iris Segmentation: Detecting Pupil, Limbus and Eyelids", IEEE 2006, 4 pages.*

(Continued)

*Primary Examiner* — Jason M Repko
*Assistant Examiner* — Ha Le
(74) *Attorney, Agent, or Firm* — Sughrue Mion, PLLC

(57) ABSTRACT

An eyelid detection device that, based on first order differential values and second order differential values of vertical density change at an eyelid boundary in an eye image, shifts the second order differential values upwards by ¼ of the cycle of density change frequency of an eyelid boundary and combines the first order differential values and the second order differential values to compute upper eyelid feature amounts. The eyelid detection device detects a boundary between an upper eyelid and eyeball based on peak points in the vertical direction of the computed upper eyelid feature amounts. Consequently, the boundary between an eyelid and eyeball can be accurately detected even when the eyelid has been applied with makeup.

11 Claims, 14 Drawing Sheets

(56) References Cited

U.S. PATENT DOCUMENTS

| | | |
|---|---|---|
| 7,912,251 B2 | 3/2011 | Suzuki et al. |
| 2004/0193068 A1* | 9/2004 | Burton et al. .................. 600/544 |
| 2008/0226138 A1 | 9/2008 | Suzuki et al. |
| 2010/0076333 A9* | 3/2010 | Burton et al. .................. 600/544 |

FOREIGN PATENT DOCUMENTS

| | | | |
|---|---|---|---|
| JP | 2008-226031 A | 9/2008 | |
| JP | 4-309927 B2 | 8/2009 | |

OTHER PUBLICATIONS

NPL—John Daugman, "How Iris Recognition Works", IEEE IEEE Transactions on Circuits and Systems for Video Technology vol. 14, No. 1, Jan. 2004, pp. 21-30.*

International Search Report of PCT/JP2011/065509 dated Aug. 2, 2011.

* cited by examiner

FIG.3A

| -1 | -1 | -1 |
|----|----|----|
| 0  | 0  | 0  |
| 1  | 1  | 1  |

PREWITT FILTER

FIG.3B

| -1 | -2 | -1 |
|----|----|----|
| 0  | 0  | 0  |
| 1  | 2  | 1  |

SOBEL FILTER

FIG.3C

| -1 |
|---|
| 0 |
| 1 |

SIMPLE DIFFERENCE FILTER

FIG.4A

| 1 | 1 | 1 |
|---|---|---|
| -2 | -2 | -2 |
| 1 | 1 | 1 |

FIG.4B

| 1 | 2 | 1 |
|---|---|---|
| -2 | -4 | -2 |
| 1 | 2 | 1 |

FIG.4C

| 1 |
|---|
| -2 |
| 1 |

FIG.4D

| 1 | 1 | 1 |
|---|---|---|
| 0 | 0 | 0 |
| -2 | -2 | -2 |
| 0 | 0 | 0 |
| 1 | 1 | 1 |

FIG.4E

| 1 | 2 | 1 |
|---|---|---|
| 0 | 0 | 0 |
| -2 | -4 | -2 |
| 0 | 0 | 0 |
| 1 | 2 | 1 |

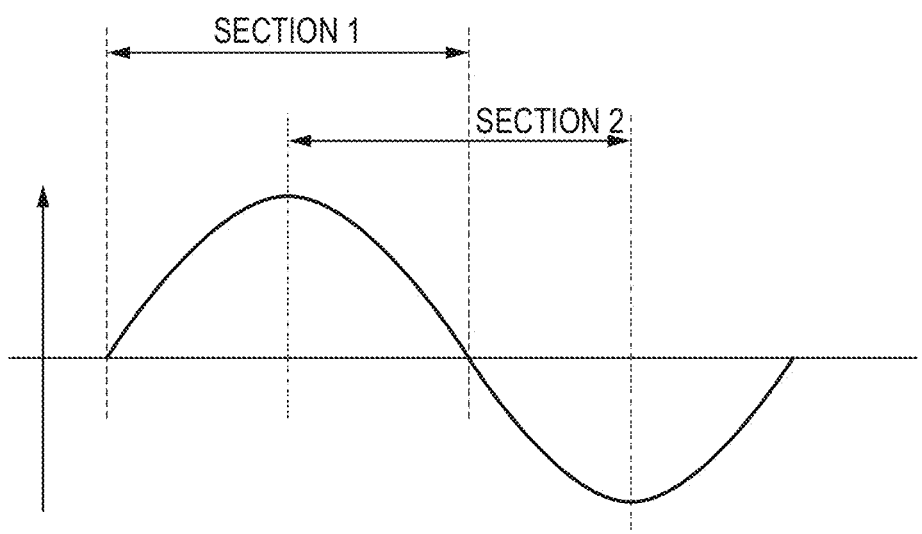

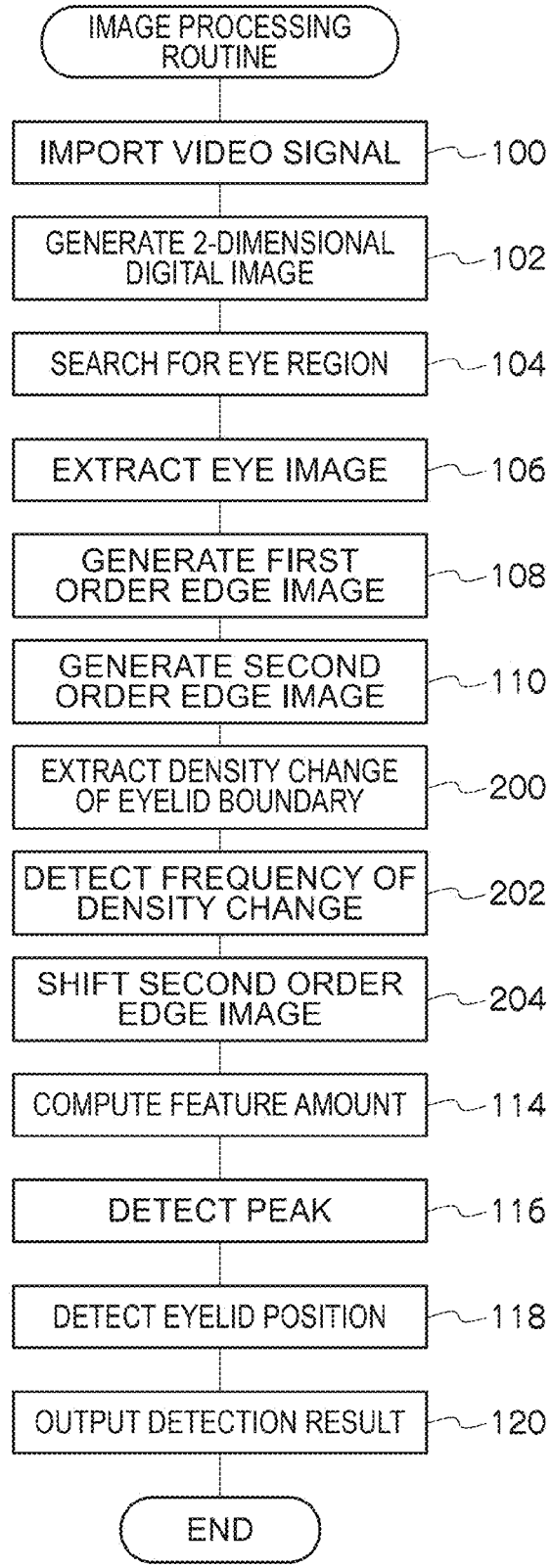

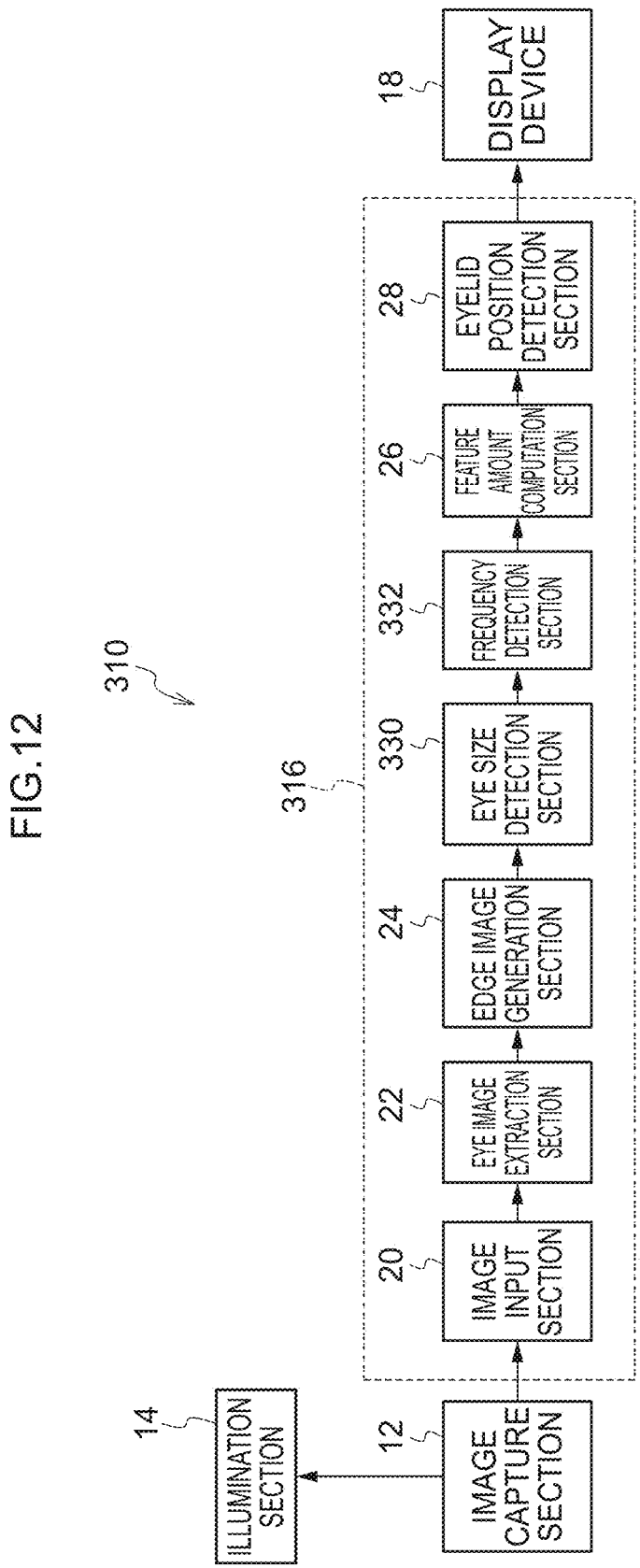

EYELID DETECTION DEVICE AND PROGRAM

CROSS REFERENCE TO RELATED APPLICATIONS

This application is a National Stage of International Application No. PCT/JP2011/065509 filed Jul. 6, 2011, claiming priority based on Japanese Patent Application No. 2010-160053, filed Jul. 14, 2010, the contents of all of which are incorporated herein by reference in their entirety.

TECHNICAL FIELD

The present invention relates to an eyelid detection device and program, and in particular relates to an eyelid detection device and program that detect boundary points of an eyelid from an image of an eye containing region.

BACKGROUND ART

Eyelid openness detection devices are known wherein boundary points of an eyelid and an eyeball are detected based on points where an edge value is a maximum value or a minimum value on a first order edge image representing the magnitude of density changes in a grayscale image (Japanese Patent No. 3143819).

Eyelid detection devices are also known wherein boundary points of an eyelid and an eyeball are detected by taking locations having a large change in value as an eyelid feature amount, rather than the maximum of first order derivative values (edge values) (Japanese Patent No. 4309927).

DISCLOSURE OF INVENTION

Technical Problem

However, in the technology of Japanese Patent No. 3143819, since maximum values of first order derivative values (edge values) are taken as eyelid positions, when made up with eyeshadow applied to the eyelid, boundary points are detected at locations distant from the boundary of the eyelid and the eyeball. There is therefore the issue that the correct boundary points cannot be detected.

In the technology of Japanese Patent No. 4309927, there is the issue that thresholds need to be set to determine positions at which first order derivative values (edge values) have a large change, and such thresholds are difficult to set considering the variety of images.

In order to address the above issues, an object of the present invention is to provide an eyelid detection device and program that can correctly detect boundary points of an eyelid and an eyeball even in cases where makeup has been applied to the eyelid.

Solution to Problem

In order to achieve the above object, a first aspect of the present invention is an eyelid detection device configured including: a generation section that, based on an image of an eye containing region, generates a first order edge image representing a magnitude of pixel value change in a specific direction for each pixel in the region, and generates a second order edge image representing a rate of change in the specific direction of the magnitude of pixel value change in the specific direction for each pixel in the region; a feature amount computation section that shifts the first order edge image or the second order edge image in the specific direction according to a cycle of a pixel value change frequency of an eyelid boundary in the image, and computes a feature amount for each pixel based on pixel values of the pixels in the first order edge image and pixel values of the pixels in the second order edge image; and an eyelid detection section that based on the feature amount computed for each of the pixels detects at least one of a boundary between an upper eyelid and an eyeball or a boundary between a lower eyelid and the eyeball.

A second aspect of the present invention is a program that causes a computer to function as: a generation section that, based on an image of an eye containing region, generates a first order edge image representing a magnitude of pixel value change in a specific direction for each pixel in the region, and generates a second order edge image representing a rate of change in the specific direction of the magnitude of pixel value change in the specific direction for each pixel in the region; a feature amount computation section that shifts the first order edge image or the second order edge image in the specific direction according to a cycle of a pixel value change frequency of an eyelid boundary in the image, and computes a feature amount for each pixel based on pixel values of the pixels in the first order edge image and pixel values of the pixels in the second order edge image; and an eyelid detection section that based on the feature amount computed for each of the pixels detects at least one of a boundary between an upper eyelid and an eyeball or a boundary between a lower eyelid and the eyeball.

According to the first aspect and the second aspect of the present invention, based on an image of an eye containing region, the first order edge image representing the magnitude of pixel value change in the specific direction for each pixel in the region is generated by the generation section, and the second order edge image representing the rate of change in the specific direction of the magnitude of pixel value change in the specific direction for each pixel in the region is generated by the generation section. The first order edge image or the second order edge image is shifted in the specific direction according to the cycle of the pixel value change frequency of an eyelid boundary in the image by the feature amount computation section, and the feature amount for each pixel based on pixel values of the pixels in the first order edge image and pixel values of the pixels in the second order edge image are computed by the feature amount computation section.

Then, based on the feature amount computed for each of the pixels, at least one of the boundary between the upper eyelid and the eyeball or the boundary between the lower eyelid and the eyeball is detected by the detection section.

Thus the boundary between the upper eyelid and the eyeball and/or the boundary between the lower eyelid and the eyeball is detected by shifting the first order edge image or the second order edge image in the specific direction according to the cycle of the pixel value change frequency of an eyelid boundary, and computing the feature amount for each pixel based on the first order edge image and the second order edge image. The boundary of an eyelid and an eyeball can accordingly be correctly detected even in cases where makeup has been applied to the eyelid.

A third aspect of the present invention further includes an eye detection section that detects an eye size from the image, wherein the feature amount computation section shifts the first order edge image or the second order edge image in the specific direction according to the cycle of the pixel value change frequency of an eyelid boundary predetermined according to the detected eye size, and computes the feature amount for each of the pixels.

A fourth aspect of the present invention further includes a pixel value change extraction section that extracts from the image pixel value change at an eyelid boundary and a frequency detection section that detects the extracted pixel value change frequency. The feature amount computation section shifts the first order edge image or the second order edge image in the specific direction according to the cycle of the pixel value change frequency detected by the frequency detection section, and computes the feature amount for each of the pixels.

In a fifth aspect of the present invention, the feature amount computation section shifts the first order edge image or the second order edge image in the specific direction by a quarter-cycle of the pixel value change frequency of an eyelid boundary in the image, and computes the feature amount for each of the pixels. Consequently, the first order edge images and the second order edge images can be aligned to match their phase shift in the pixel value change at an eyelid boundary.

In a sixth aspect of the present invention the above specific direction is a blink direction.

In a seventh aspect of the present invention the feature amount computation section shifts the first order edge image downwards in the blink direction and computes the feature amount for each of the pixels, and the eyelid detection section detects a boundary between the upper eyelid and the eyeball based on the computed feature amount. Consequently, the first order edge images and the second order edge images can be aligned to match their phase shift in the pixel value change at an upper eyelid boundary, and the boundary between an upper eyelid and an eyeball can be correctly detected.

In an eighth aspect of the present invention the feature amount computation section shifts the second order edge image upwards in the blink direction and computes the feature amount for each of the pixels, and the eyelid detection section detects a boundary between the upper eyelid and the eyeball based on the computed feature amount. Consequently, the first order edge images and the second order edge images can be aligned to match their phase shift in the pixel value change at an upper eyelid boundary, and the boundary between an upper eyelid and an eyeball can be correctly detected.

In a ninth aspect of the present invention the feature amount computation section computes the feature amount for each of the pixels by taking a weighted sum or product of respective pixel values of the pixels in the first order edge image and respective pixel values of the pixels in the second order edge image.

In a tenth aspect of the present invention the eyelid detection section detects at least one of a boundary between the upper eyelid and the eyeball or a boundary between the lower eyelid and the eyeball based on a peak point in the specific direction of the computed feature amounts.

Advantageous Effects of Invention

As explained above, according to the eyelid detection device and program of the present invention, the first order edge image or the second order edge image is shifted in the specific direction according to the cycle of the pixel value change frequency of an eyelid boundary in the image, the feature amount for each pixel is computed based on the first order edge image and the second order edge image, and a boundary between an upper eyelid and an eyeball and/or a boundary between a lower eyelid and the eyeball is detected. Consequently, the advantageous effect is exhibited of enabling the boundary of an eyelid and an eyeball to be correctly detected even in cases where makeup has been applied to the eyelid.

BRIEF DESCRIPTION OF DRAWINGS

FIG. 3A is an illustration of a Prewitt filter.
FIG. 3B is an illustration of a Sobel filter.
FIG. 3C is an illustration of a simple difference filter.
FIG. 4A is an illustration of an example of a vertical direction second order derivative filter.
FIG. 4B is an illustration of an example of a vertical direction second order derivative filter.
FIG. 4C is an illustration of an example of a vertical direction second order derivative filter.
FIG. 4D is an illustration of an example of a vertical direction second order derivative filter.
FIG. 4E is an illustration of an example of a vertical direction second order derivative filter.
FIG. 4F is an illustration of an example of a vertical direction second order derivative filter.
FIG. 5 is a diagram illustrating a sine wave.
FIG. 11 is a flowchart illustrating contents of an image processing routine of an eyelid detection device according to the second exemplary embodiment of the present invention.
FIG. 12 is a block diagram illustrating a configuration of an eyelid detection device according to a third exemplary embodiment of the present invention.

BEST MODE FOR CARRYING OUT THE INVENTION

Detailed explanation follows regarding an exemplary embodiment of the present invention, with reference to the drawings. Note that in the present exemplary embodiment, explanation is given of a case in which the present invention is applied to an eyelid detection device that derives and outputs eyelid openness from a grayscale image.

Figure 1:
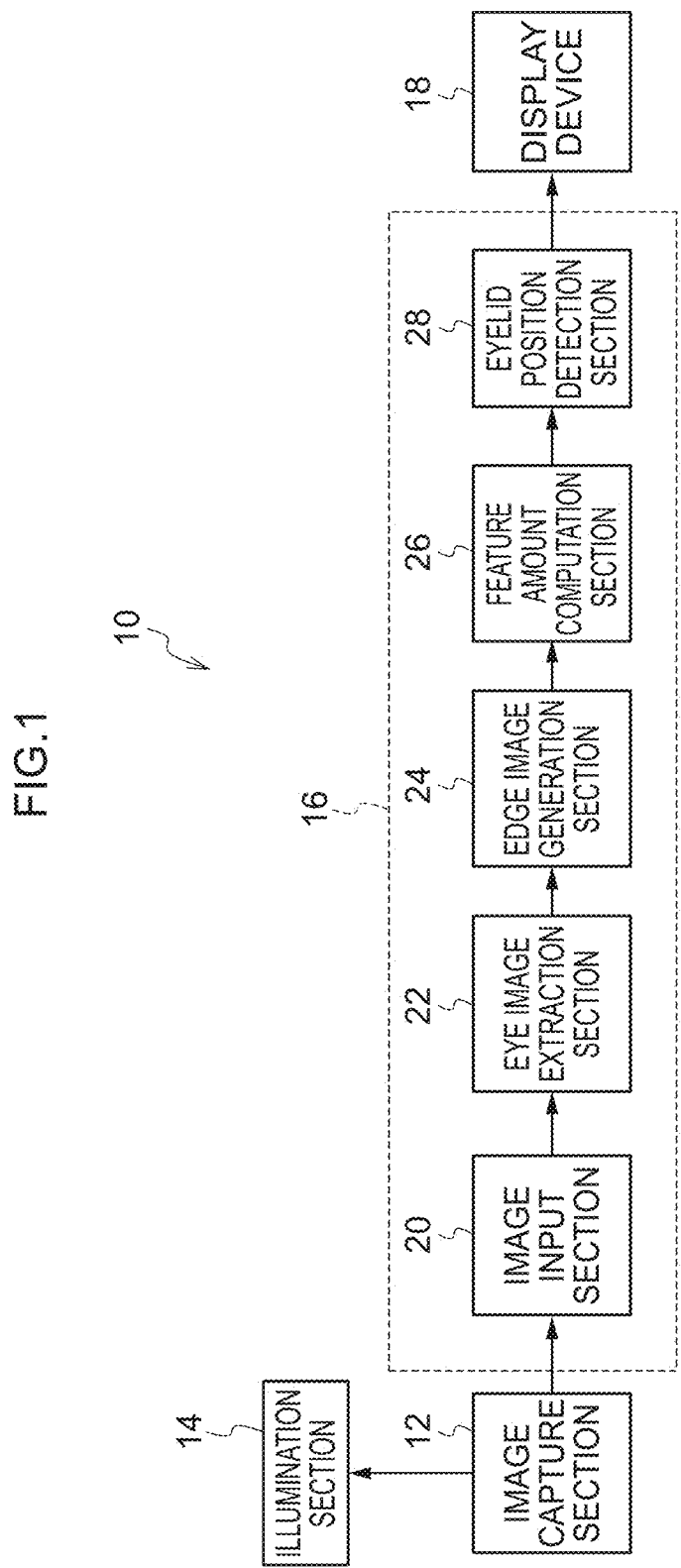
FIG. 1 is a block diagram illustrating a configuration of an eyelid detection device according to a first exemplary embodiment of the present invention.

As illustrated in FIG. 1, an eyelid detection device 10 according to a first exemplary embodiment includes an image capture section 12, configured for example by a CCD camera, that captures an image including the face of a detection subject, an illumination section 14, configured for example from an infrared strobe or an infrared LED, that is synchronized to shutter operation of the image capture section 12 and illuminates an imaging subject, a computer 16 that performed image processing, and a display device 18 configured for example by a CRT.

The computer 16 is configured including a CPU, ROM stored with a program of an image processing routine, described later, RAM stored with data and a bus for connecting these sections together. When the computer 16 is explained as functional blocks divided for each functional execution process determined based on hardware and software then, as illustrated in FIG. 1, the computer 16 includes: an image input section 20 that imports a face image that is a grayscale image output from the image capture section 12; an eye image extraction section 22 that extracts an image of a small eye containing region, namely an eye image, from the face image output from the image input section 20; an edge image generation section 24 that takes the eye image extracted by the eye image extraction section 22 and computes first order differential values in the vertical direction therein and generates a first order edge image, and computes second order differential values in the vertical direction therein and generates a second order edge image; a feature amount computation section 26 that computes an eyelid feature amount for each pixel based on the first order edge image and the second order edge image; and an eyelid position detection section 28 that detects an eyelid position based on the computed eyelid feature amounts and displays eyelid openness on the display device 18.

The image input section 20 is configured for example by an A/D converter and an image memory that stores one frame of image data.

The eye image extraction section 22 searches for an eye region in a face image, identifies an extraction position, and extracts as an eye image a small eye containing region based on the identified extraction position.

Figure 2:
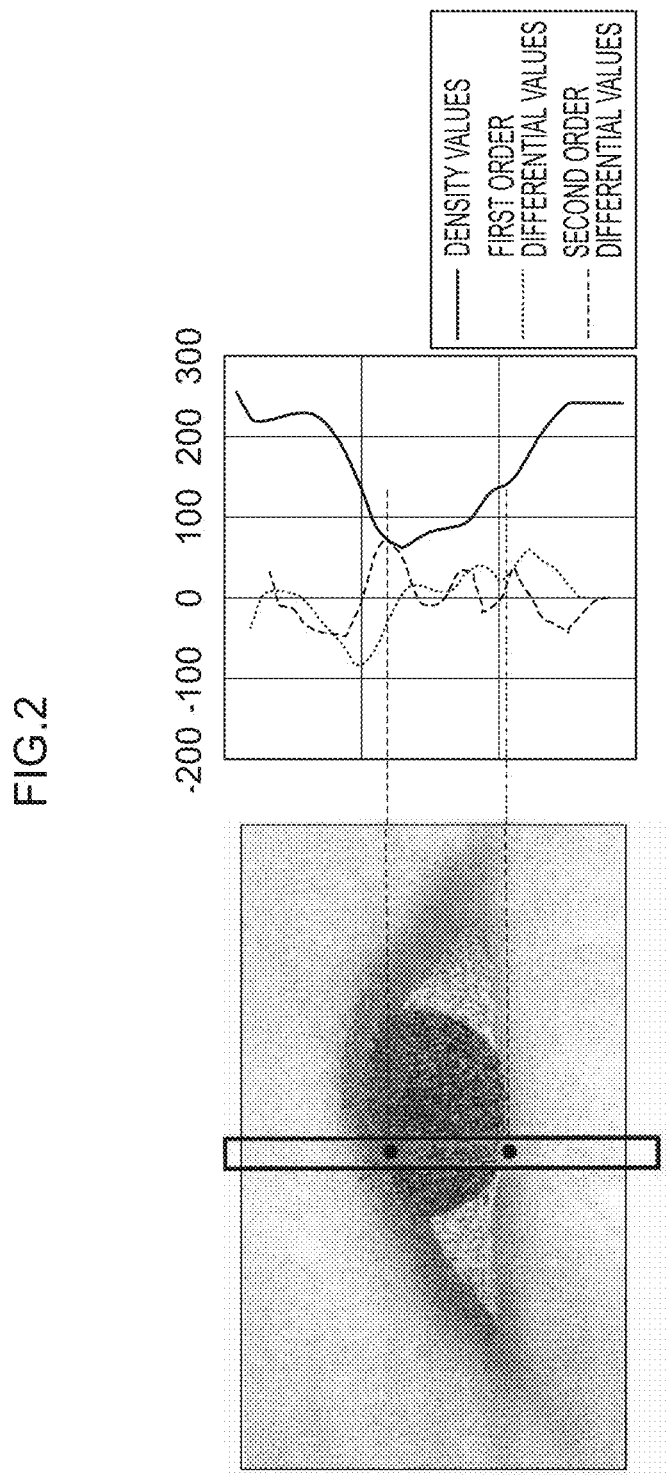
FIG. 2 is an illustration showing an image of an eye, and a graph showing vertical direction changes in density values, changes in first order derivative values and changes in second order derivative values.

The edge image generation section 24 employs a Prewitt filter as illustrated in FIG. 3A as a vertical first order derivative filter, and generates from the eye image illustrated in FIG. 2 a first order edge image with pixel values of the first order differential values representing the magnitude of density change (grayscale change) for each pixel in the direction from the top towards the bottom, this being the blink direction, as illustrated in FIG. 2. Note that the edge image generation section 24 may employ a Sobel filter as illustrated in FIG. 3B, or a simple difference filter as illustrated in FIG. 3C, as the vertical first order derivative filter to generate a first order edge image.

The edge image generation section 24 employs a vertical second order differential filter as illustrated in FIG. 4A, and generates from an eye image as illustrated in FIG. 2 a second order edge image with pixel values of second order differential values representing the rate of change in the magnitude of density change of each pixel in the direction from the top towards the bottom, this being the blink direction, as illustrated in FIG. 2.

Note that the edge image generation section 24 may employ one of the filters illustrated in FIG. 4B to FIG. 4F as the vertical second order differential filter to generate the second order edge image.

Explanation follows regarding the principle for computing the eyelid feature amount.

Generally, an eyeball portion is captured as being darker than an eyelid, which is a skin region, due to having a lower reflectivity. Therefore, as illustrated in FIG. 2, in an image taken of an eye, in the direction from top to bottom, a portion that changes "light (skin)"→"dark (boundary portion between skin and eyeball)" is detected as an upper eyelid boundary, and a portion that changes from "dark"→"light" is detected as a lower eyelid boundary, as illustrated in FIG. 2.

In order to extract such changes, the first order differential values of the image (the edge values) are calculated by the edge image generation section 24. The first order differential values are larger in value at density change portions, and so it is possible to detect the boundary of an eyelid by detecting the portions with large first order differential values.

However, when made up with eyeshadow applied to the upper eyelid, the first order differential values become larger. Therefore sometimes the made up portion is mistakenly detected as the boundary of the eyelid.

There is however a difference in that although the first order differential values of the made up portion change gradually, the first order differential values change sharply actually at the eyelid position.

In order to detect this difference, the first order differential values are differentiated again and second order differential values are calculated in the edge image generation section 24.

In the present exemplary embodiment, the first order differential values and the second order differential values are combined to compute an eyelid feature amount.

Due to differentiation, the positions of peaks in the first order differential values and in the second order differential values are shifted from each other by a quarter-cycle. For example, the differential of $\sin\theta$ is $\cos\theta$, however since 1 cycle is $2\pi$, $\cos\theta = \sin(\theta+\pi/2)$, this being a shift of a quarter-cycle.

In the present exemplary embodiment, in order to align the positions of the peaks in the first order differential values and in the second order differential values, to compute the eyelid feature amount the second order differential values are first shifted by a quarter-cycle, then the first order differential values and the second order differential values are combined.

Based on a pre-derived cycle of vertical density change frequency at the boundary of an eyelid, the feature amount computation section 26 shifts the second order edge image in the image upwards and downwards directions by a quarter-cycle.

The cycle of the vertical density change frequency of an eyelid boundary is pre-derived as explained below.

First, an eye image is extracted from an image captured by the image capture section 12, and the density change in the vertical direction at the eyelid boundary is extracted from the eye image. Then, a sine wave as illustrated in FIG. 5 is employed on the extracted vertical density changes, and the frequency of density change is detected. The section of the sine wave employed for frequency detection is, for example, taken as the interval between crossing points, or between a maximum point and a minimum point, as illustrated in FIG. 5.

Figure 6:
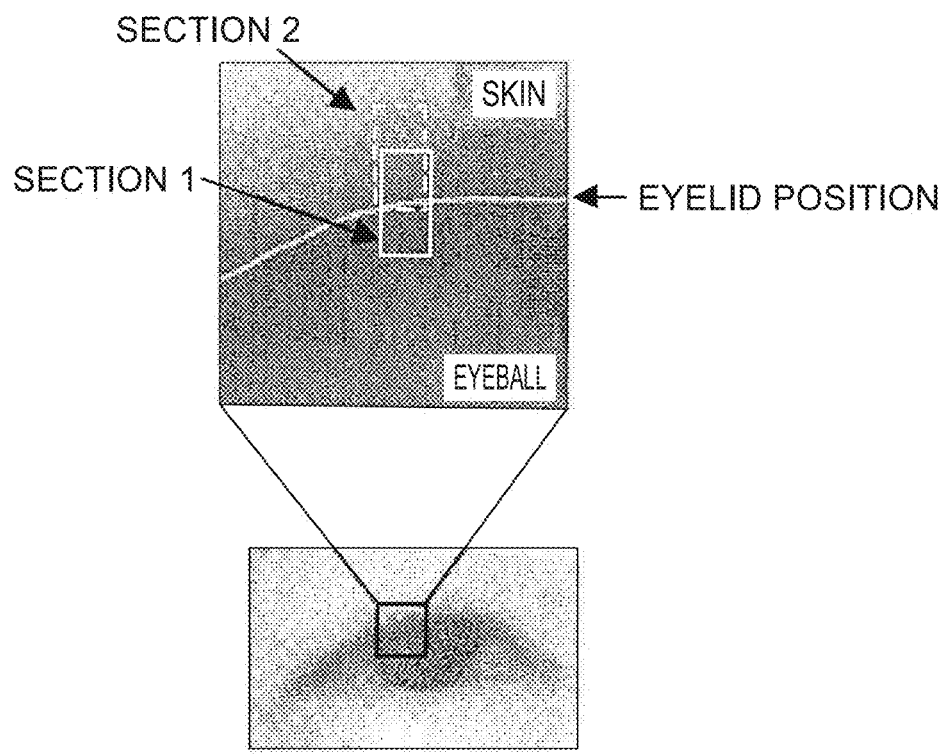
FIG. 6 is diagram illustrating regions for fitting a sine wave.
Figure 7:
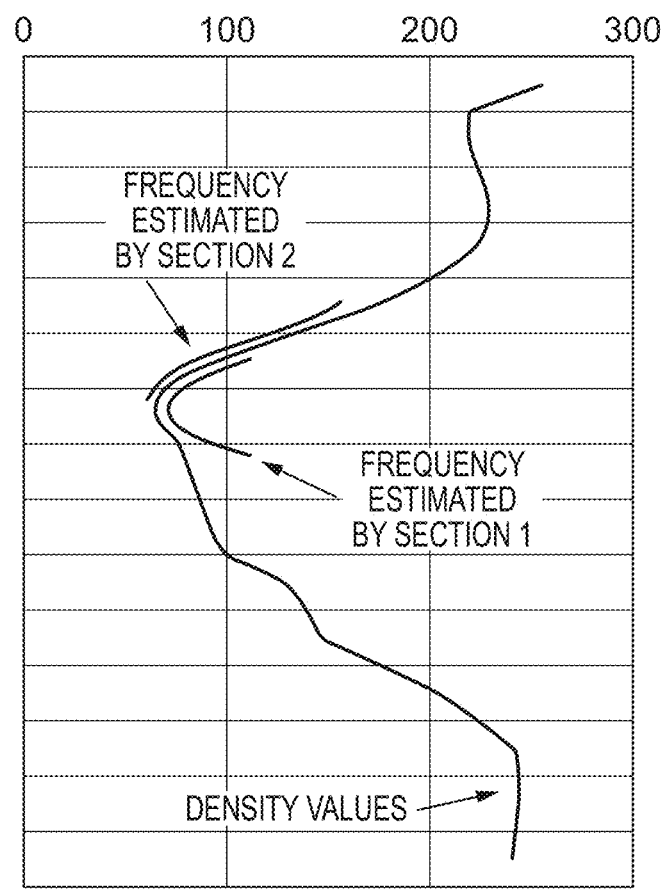
FIG. 7 is an illustration of sine wave fitting.

The predetermined section of the sine wave is employed, and, while changing the frequency and amplitude of the sine wave, fitting is performed so as to match to the density change of a region corresponding to an eyelid position as illustrated in FIG. 6. Then, as illustrated in FIG. 7, the frequency of the density change at an eyelid boundary is estimated, and the cycle of the frequency is derived and stored in a memory (not illustrated in the drawings).

Note that a triangular wave may be employed instead of a sine wave to estimate the frequency of density change.

Figure 8:
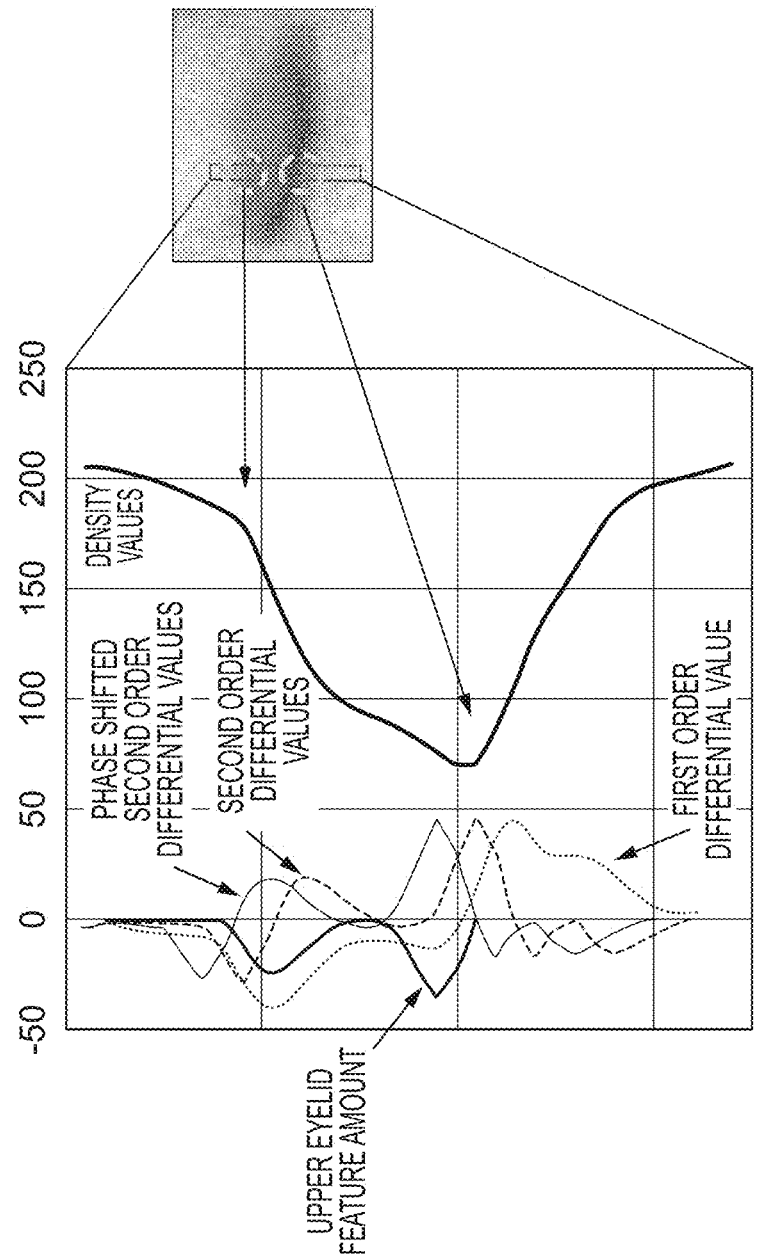
FIG. 8 is a graph showing vertical direction changes in density values, changes in first order derivative values, changes in second order derivative values, and changes in upper eyelid feature amounts.

The feature amount computation section 26, as illustrated in FIG. 8, then shifts the second order differential values by a quarter-cycle of the vertical density change frequency of an eyelid boundary upwards in the image, this being the blink direction. The feature amount computation section 26 then, based on the first order edge image and the upwards shifted second order edge image, computes from the pixel values of each of the pixels an upper eyelid feature amount $e_{upper}(x, y)$ for each of the pixels according to the following Equation (1).

$$e_{upper}(x, y) = \alpha \times e_1(x, y) - (1-\alpha) \times e_2(x, y+t) \quad (1)$$

Wherein $e_1(x, y)$ is the first order differential value of the first order edge image at the coordinate position $(x, y)$. t is the phase shift amount, $e_2(x, y+t)$ is the second order differential value at the coordinate position $(x, y+t)$ of the second order edge image prior to shifting, corresponding to the coordinate position $(x, y)$. $0 \le \alpha \le 1$. In Equation (1) $e_1(x, y)$ is weighted by $\alpha$, $e_2(x, y+t)$ is weighted by $(1-\alpha)$, and then the two terms are summed. Note that the example of FIG. 8 illustrates a case in which $\alpha=0.25$, $t=2$ when a made up eye is closed.

In the feature amount computation section 26, the second order edge image is also shifted downwards in the image by a quarter-cycle of the vertical density change frequency of an eyelid boundary. The feature amount computation section 26 then computes from the pixel values of each of the pixels a lower eyelid feature amount $e_{lower}(x, y)$ of each pixel according to the following Equation (2) based on the first order edge image and the downwards shifted second order edge image.

$$e_{lower}(x, y) = \beta \times e_1(x, y) + (1-\beta) \times e_2(x, y-t) \quad (2)$$

Wherein $e_1(x, y)$ is the first order differential value of the first order edge image at the coordinate position $(x, y)$. t is the phase shift amount, $e_2(x, y-t)$ is the second order differential value at the coordinate position $(x, y-t)$ of the second order edge image prior to shifting, corresponding to the coordinate position $(x, y)$. $0 \le \beta \le 1$. In Equation (2) $e_1(x, y)$ is weighted by $\beta$, $e_2(x, y-t)$ is weighted by $(1-\beta)$, and then the two terms are summed.

The eyelid position detection section 28 takes the vertical peak point of the upper eyelid feature amount as a first boundary point representing the boundary between the upper eyelid and the eyeball. The eyelid position detection section 28 performs eyelid profile fitting on a collection of the vertical peak points of upper eyelid feature amount computed for each pixel by changing various parameters of an upper eyelid profile model (which may be either 2-dimensional or 3-dimensional) including the positions of the inner and outer eye corners. The eyelid position detection section 28 detects the upper eyelid profile and position where the evaluation values are at a maximum. The eyelid position detection section 28 also takes the vertical peak point of the lower eyelid feature amount as a second boundary point representing the boundary between the lower eyelid and the eyeball. The eyelid position detection section 28 performs eyelid profile fitting on a collection of the vertical peak points of the lower eyelid feature amount computed for each pixel by changing various parameters of a lower eyelid profile model (which may be either 2-dimensional or 3-dimensional) including the positions of the inner and outer eye corners. The eyelid position detection section 28 detects the lower eyelid profile and position where the evaluation values are at a maximum. Note that the computed upper eyelid feature amount or the lower eyelid feature amount may be employed in the fitting evaluation values.

The eyelid position detection section 28 calculates the eyelid openness from the detected upper eyelid profile and lower eyelid profile and outputs the result to the display device 18.

Explanation follows regarding operation of the eyelid detection device 10. First the image capture section 12 captures a face image of a test subject. When this is performed, in order to reduce the influence of peripheral scattered light, light emission from the illumination section 14 configured from an infrared strobe is synchronized with the imaging of the image capture section 12 and employed to illuminate the face region of the test subject. Note that if continuous light is employed for light emission from the illumination section 14 then synchronization with the image capture section 12 is not required, simplifying configuration.

Figure 9:
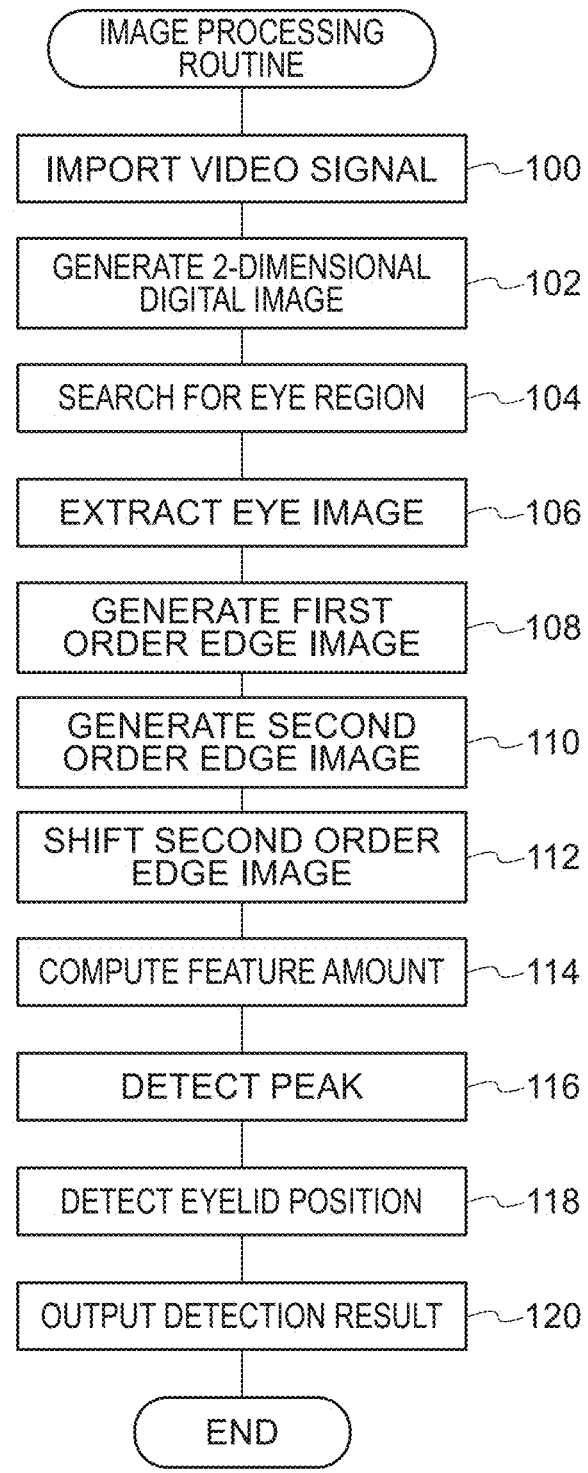
FIG. 9 is a flowchart illustrating contents of an image processing routine of an eyelid detection device according to the first exemplary embodiment of the present invention.

Then, an image processing routine as illustrated in FIG. 9 is executed in the computer 16. First at step 100 the computer 16 imports a face image captured by the image capture section 12 as a video signal. At step 102, the computer 16 A/D converts the video signal and generates a 2-dimensional image. In the present exemplary embodiment, subsequent processing is performed as digital processing based on this digital image, and so when reference is made simply to image in the following this refers to a digital image.

Then at step 104, the computer 16 searches for an eye region within the face image, and sets an eye containing region as an extraction region. At step 106, the computer 16 extracts a small region including one eye as an eye image. Note that searching for an eye region may, for example, be performed by searching for an eye region within the face image by employing image processing using a template matching method. Alternatively, an operator may specify an eye region by indicating an eye on a face image using an eye region indicator such as a keyboard, mouse, electronic pen or light pen.

Then at step 108, the computer 16 performs edge processing employing the Prewitt filter as illustrated in FIG. 3A on the eye image extracted at step 106, and generates a first order edge image with pixel values of the first order differential values representing the magnitude of density change as pixel value change for each pixel in the direction from top to bottom. For example, taking the current image coordinates as $(x, y)$, and the pixel value at $(x, y)$ as $A(x, y)$, then the first order differential value $E(x, y)$ at $(x, y)$ in the first order edge image is derived according to the following equation.

$$E(x, y) = A(x-1, y-1) + A(x, y-1) + A(x+1, y-1) - A(x-1, y+1) - A(x, y+1) + A(x+1, y+1)$$

Then at step 110, the computer 16 performs edge processing on the eye image extracted at step 106 employing a vertical second order differential filter such as illustrated in FIG. 4A. The computer 16 generates a second order edge image in which the pixel values are the second order differential values representing the rate of change in the magnitude of density change as the change in pixel values for each pixel in the direction from top to bottom. For example, taking the current image coordinates as $(x, y)$, and the pixel value at $(x, y)$ as $A(x, y)$, then the second order differential value $E'(x, y)$ at $(x, y)$ in the second order edge image is derived according to the following equation.

$$E'(x, y) = A(x-1, y-1) + A(x, y-1) + A(x+1, y-1) - 2A(x-1, y) - 2A(x, y) + 2A(x+1, y) + A(x-1, y+1) - A(x, y+1) + A(x+1, y+1)$$

Then at step 112, the computer 16 shifts the second order edge image upwards in the image by a pre-derived quarter-cycle of frequency of vertical density change at an eyelid boundary to compute the upper eyelid feature amount, and shifts the second order edge image downwards in the image by a quarter-cycle to compute the lower eyelid feature amount.

Then at step 114, the computer 16 computes the upper eyelid feature amount for each pixel based on the first order edge image generated at step 108 and based on the second order edge image shifted upwards at step 112. The computer 16 also computes the lower eyelid feature amount for each pixel based on the first order edge image generated at step 108 and based on the second order edge image shifted downwards at step 112.

Then at step 116, the computer 16 detects the vertical peak point of the upper eyelid feature amount computed at step 114, and detects the vertical peak point of the lower eyelid feature amount computed at step 114. At step 118, the computer 16 detects the upper eyelid profile and position from a collection of the vertical peak points of the upper eyelid feature amount detected at step 116, and detects the lower eyelid profile and position from a collection of the vertical peak points of the lower eyelid feature amount detected at step 116.

Then at step 120, the computer 16 displays on the display device 18 an eyelid openness derived from the upper eyelid profile and position and the lower eyelid profile and position detected at step 118, and ends the image processing routine.

As explained above, the eyelid detection device according to the first exemplary embodiment shifts the second order edge image vertically by a quarter-cycle of the frequency of density change at an eyelid boundary, and aligns the first order edge images and the second order edge images to match their phase shift in the pixel value change at an eyelid boundary. The eyelid detection device computes the upper eyelid feature amount and the lower eyelid feature amount for each of the pixels based on the first order edge image and the second order edge image and detects the eyelid position. The eyelid detection device is thereby able correctly detect eyelid position even when makeup has been applied to the eyelid.

When an eyelid has been made up it becomes difficult to find a difference between the eyelid feature amounts (first order differential value) at the made up portion and the actual eyelid portion. Therefore, in order to find a portion where there is a change in the first order differential value, the eyelid detection device calculates the change amount of the first order differential values, namely second order differential values, then phase shifted values of the second order differential values are added to compute an eyelid feature amount, such that the computed eyelid feature amount becomes larger at locations close the actual eyelid. By so doing, the eyelid detection device can make the eyelid feature amount become large at locations close to the eyelid position even when makeup such as eyeshadow has been applied to the eyelid, enabling the eyelid position to be detected with high precision.

The eyelid detection device is also able to calculate the eyelid openness with high precision by accurately detecting eyelid positions.

Explanation follows regarding a second exemplary embodiment. Note that the same reference numerals are appended to portions of the configuration similar to that of the first exemplary embodiment, and further explanation thereof is omitted.

In the second exemplary embodiment, the eyelid detection device differs from the first exemplary embodiment in the point that when detecting the eyelid position, the frequency change is detected from density change obtained from the eye image.

Figure 10:
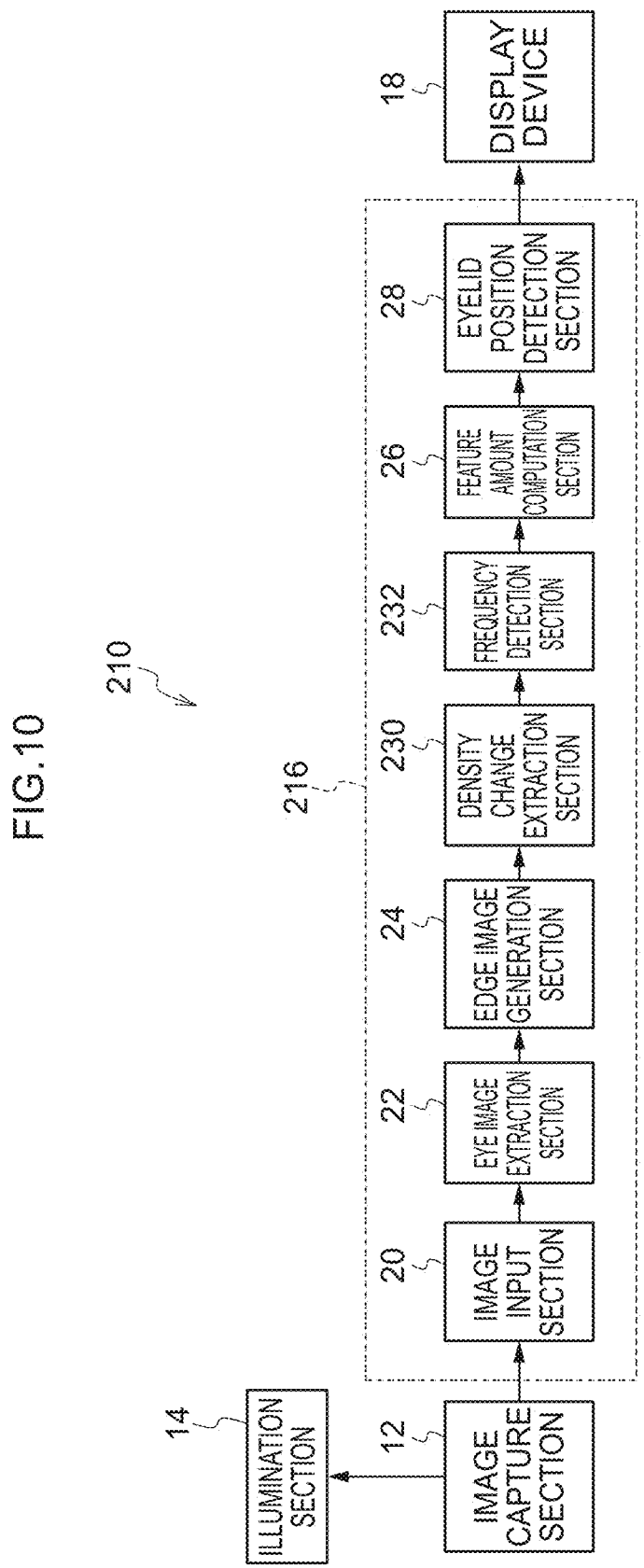
FIG. 10 is a block diagram illustrating a configuration of an eyelid detection device according to a second exemplary embodiment of the present invention.

As illustrated in FIG. 10, a computer 216 of an eyelid detection device 210 according to a second exemplary embodiment includes an image input section 20, an eye image extraction section 22, an edge image generation section 24, a density change extraction section 230 that extracts vertical density change at an eyelid boundary from an eye image, a frequency detection section 232 that detects the frequency of the extracted density change, a feature amount computation section 26, and an eyelid position detection section 28.

The density change extraction section 230 extracts the vertical density change in a predetermined region including the eyelid boundary from the eye image extracted by the eye image extraction section 22.

The frequency detection section 232, employs a predetermined section of a sine wave on the extracted vertical density change, and performs fitting on the extracted vertical density change to match a predetermined section of a sine wave to the density change of a range corresponding to the eyelid position while changing the frequency and amplitude of the sine wave, thereby detecting the frequency of the density change at an eyelid boundary.

The feature amount computation section 26 shifts the second order edge image upwards by a quarter-cycle of the detected frequency, and computes the upper eyelid feature amount $e_{upper}(x, y)$ according to above Equation (1).

The feature amount computation section 26 also shifts the second order edge image downwards by a quarter-cycle of the detected frequency, and computes the lower eyelid feature amount $e_{lower}(x, y)$ according to above Equation (2).

Explanation follows regarding an image processing routine according to the second exemplary embodiment, with reference to FIG. 11. Note that processing similar to that of the first exemplary embodiment is allocated the same reference numerals and further explanation thereof is omitted.

First, at step 100, the computer 216 imports a face image that has been captured by the image capture section 12 as a video signal. At step 102, the computer 216 generates a 2-dimensional digital image. Then at step 104, the computer 216 searches for an eye containing region in the face image, and determines an eye containing region as an extraction region. At step 106, the computer 216 extracts a small region containing a single eye as an eye image.

Then at step 108, the computer 216 performs edge processing on the eye image that was extracted at step 106 and generates a first order edge image. Next, at step 110, the computer 216 performs edge processing employing a vertical second order differential filter on the eye image extracted at above step 106, and generates a second order edge image.

Then at step 200, the computer 216 extracts the vertical density change from a predetermined region containing an eyelid boundary in the eye image extracted at above step 106. Then at step 202, the computer 216 detects the frequency of the vertical density change that was extracted at step 200.

Then at step 204, the computer 216 shifts the second order edge image upwards in the image by a quarter-cycle of the frequency detected at step 202 for use in computation of the upper eyelid feature amount, and shifts the second order edge image downwards in the image by a quarter-cycle of the frequency detected at step 202 for use in computation of the lower eyelid feature amount.

Then at step 114, the computer 216 computes the upper eyelid feature amount and computes the lower eyelid feature amount for each of the pixels. Then at step 116, the computer 216 detects the peak points in the vertical direction of the upper eyelid feature amounts computed at step 114 and computes the peak points in the vertical direction of the lower eyelid feature amounts computed at step 114. Then at step 118, the computer 216 detects the upper eyelid profile and position from a collection of the vertical direction peak points of the upper eyelid feature amounts detected at step 116. The computer 216 also detects the lower eyelid profile and position from a collection of the vertical direction peak points of the lower eyelid feature amounts detected at step 116.

Then at step 120, the computer 216 displays on the display device 18 an eyelid openness derived from the upper eyelid profile and position and the lower eyelid profile and position detected at step 118, thereby ending the image processing routine.

Thus, the eyelid detection device, when detecting the eyelid position, detects the frequency of pixel value change at an eyelid boundary and shifts the second order edge image in the vertical direction by a quarter-cycle of the detected frequency. The eyelid detection device is accordingly able to align the first order edge images and the second order edge images to match their phase shift in the pixel value change at an eyelid boundary, enabling eyelid feature amounts that become large at locations close to the actual eyelid to be computed.

Explanation follows regarding a third exemplary embodiment. Note that portions of the configuration similar to those of the first exemplary embodiment are allocated the same reference numerals and further explanation thereof is omitted.

In the third exemplary embodiment, the eyelid detection device differs from the first exemplary embodiment in the points that eye size is detected from the eye image, and the density change frequency of an eyelid boundary is determined from the eye size.

As illustrated in FIG. 12, a computer 316 of the eyelid detection device 310 according to the third exemplary embodiment includes an image input section 20, an eye image extraction section 22, an edge image generation section 24, an eye size detection section 330 that acquires an eye image and detects eye size, a frequency determination section 332 that determines density change frequency of an eyelid boundary according to the detected eye size, a feature amount computation section 26, and an eyelid position detection section 28.

The eye size detection section 330 acquires the eye image extracted by the eye image extraction section 22, and detects the eye size from the eye image (for example the separation between the inside and outside corners of the eye).

The frequency determination section 332 is pre-stored with correspondence relationships between eye size and vertical density change frequency of an eyelid boundary. The frequency determination section 332 determines the density change frequency of an eyelid boundary corresponding to the detected eye size based on these correspondence relationships.

The feature amount computation section 26 shifts the second order edge images upwards by a quarter-cycle of the determined frequency, and computes the upper eyelid feature amount $e_{upper}$ (x, y) for each of the pixels according to the above Equation (1).

The feature amount computation section 26 also shifts the second order edge images downwards by a quarter-cycle of the determined frequency, and computes the upper eyelid feature amount $e_{lower}$ (x, y) for each of the pixels according to the above Equation (2).

Explanation follows regarding operation of the eyelid detection device 310 according to the third exemplary embodiment.

First the computer 316 imports a face image that has been captured by the image capture section 12 as a video signal, performs A/D conversion on the video signal, and generates a 2-dimensional digital image. The computer 316 then searches for an eye containing region in the face image, determines an eye containing region as an extraction region, then extracts a small region containing a single eye as an eye image.

The computer 316 then detects the eye size from the extracted eye image, and determines the density change frequency of an eyelid boundary corresponding to the detected eye size, and stores the determined frequency in a memory (not illustrated in the drawings).

The computer 316 then executes a similar image processing routine to that of the first exemplary embodiment described above.

The eyelid detection device thus detects the eye size from the eye image, determines the density change frequency of an eyelid boundary according to the eye size, and vertically shifts the second order edge image by a quarter-cycle of the determined frequency. The eyelid detection device is accordingly able to align the first order edge images and the second order edge images to match their phase shift in the pixel value change at an eyelid boundary, enabling eyelid feature amounts to be computed that become large at locations close to the actual eyelid.

Note that explanation has been given of a case in the above exemplary embodiment in which correspondence relationships between eye size and density change frequency of an eyelid boundary are pre-stored, however there is no limitation thereto. Correspondence relationships between eye size and cycle of density change frequency of an eyelid boundary may be pre-stored.

Note that in the first exemplary embodiment to the third exemplary embodiment above, explanation has been given of cases in which the eyelid detection device generates edge images representing the magnitude of density change from a grayscale image input by an image input section, however the images input by an image input section may be color images. In such cases the eyelid detection device may generate edge images representing the magnitude of change in density values of color images.

Moreover, whereas explanation has been given of examples of cases in which the eyelid detection device performs edge processing employing a vertical second order differential filter on an eye image to compute second order differential values, there is no limitation thereto. The eyelid detection device may be configured to perform edge processing using a vertical first order derivative filter one more time on a first order edge image to compute the second order differential values.

Moreover, whereas explanation has been given of examples of cases in which the eyelid detection device shifts the second order edge image in the blink direction (vertical direction) there is no limitation thereto. The eyelid detection device may shift the first order edge image in the blink direction. In such cases, the eyelid detection device may be configured to shift the first order edge image downwards in the blink direction by a quarter-cycle of the vertical density change frequency at an eyelid boundary, and compute the upper eyelid feature amount for each of the pixels based on the downwards shifted first order edge image and the second order edge image. The eyelid detection device may also be configured to shift the first order edge image upwards in the blink direction by a quarter-cycle of the vertical density change frequency at an eyelid boundary, and compute the lower eyelid feature amount for each of the pixels based on the upwards shifted first order edge image and the second order edge image.

Moreover, since makeup is applied to the upper eyelid, configuration may be made such that the first order edge image or the second order edge image is shifted in the blink direction only for use in computing the upper eyelid feature amount.

Whilst explanation has been given of examples of cases in which the eyelid detection device weights the first order edge image pixel values and the second order edge image pixel values and then sums the two terms so as to compute the eyelid feature amount, there is no limitation thereto. The eyelid detection device may multiply together the first order edge image pixel values and the second order edge image pixel values so as to compute the eyelid feature amount for each of the pixels.

Whilst explanation has been given of examples of cases in which the eyelid detection device performs eyelid profile fitting on collections of peak points of the eyelid feature amounts and then detects the eyelid position, there is no limitation thereto. The eyelid detection device may be configured to detect the eyelid position using another method.

It is possible to provide the program of the present invention stored on a storage medium.

A computer readable medium according to the present invention is stored with a program that causes a computer to function as: a generation section that, based on an image of an eye containing region, generates a first order edge image representing the magnitude of pixel value change in a specific direction for each pixel in the region, and generates a second order edge image representing the rate of change in the specific direction of the magnitude of pixel value change in the specific direction for each pixel in the region; a feature amount computation section that shifts the first order edge image or the second order edge image in the specific direction according to a cycle of a pixel value change frequency of an eyelid boundary in the image, and computes a feature amount for each pixel based on pixel values of the pixels in the first order edge image and pixel values of the pixels in the second order edge image; and an eyelid detection section that based on the feature amount computed for each of the pixels detects a boundary between an upper eyelid and an eyeball and/or a boundary between a lower eyelid and the eyeball.

The entire disclosure of Japanese Patent Application No. 2010-160053 is incorporated by reference in the present specification.

All cited documents, patent applications and technical standards mentioned in the present specification are incorporated by reference in the present specification to the same extent as if the individual cited documents, patent applications and technical standards were specifically and individually incorporated by reference in the present specification.

The invention claimed is:

1. An eyelid detection device, comprising:
    a generation section that, based on an image of an eye containing region, generates a first order edge image representing a magnitude of pixel value change in a specific direction for each pixel in the region, and generates a second order edge image representing a rate of change in the specific direction of the magnitude of pixel value change in the specific direction for each pixel in the region;
    a feature amount computation section that shifts the first order edge image or the second order edge image in the specific direction according to a cycle of a pixel value change frequency of an eyelid boundary in the image, and computes a feature amount for each pixel based on pixel values of the pixels in the first order edge image and pixel values of the pixels in the second order edge image; and
    an eyelid detection section that, based on the feature amount computed for each of the pixels, detects at least one of a boundary between an upper eyelid and an eyeball or a boundary between a lower eyelid and the eyeball.

2. The eyelid detection device of claim 1, further comprising an eye detection section that detects an eye size from the image, wherein the feature amount computation section shifts the first order edge image or the second order edge image in the specific direction according to the cycle of the pixel value change frequency of an eyelid boundary predetermined according to the detected eye size, and computes the feature amount for each of the pixels.

3. The eyelid detection device of claim 1, further comprising:
    a pixel value change extraction section that extracts, from the image, pixel value change at an eyelid boundary; and
    a frequency detection section that detects the extracted pixel value change frequency,
    wherein the feature amount computation section shifts the first order edge image or the second order edge image in the specific direction according to the cycle of the pixel value change frequency detected by the frequency detection section, and computes the feature amount for each of the pixels.

4. The eyelid detection device of claim 1, wherein the feature amount computation section shifts the first order edge image or the second order edge image in the specific direction by a quarter-cycle of the pixel value change frequency of an eyelid boundary in the image, and computes the feature amount for each of the pixels.

5. The eyelid detection device of claim 1, wherein the specific direction is a blink direction.

6. The eyelid detection device of claim 5, wherein:
    the feature amount computation section shifts the first order edge image downwards in the blink direction and computes the feature amount for each of the pixels; and
    the eyelid detection section detects a boundary between the upper eyelid and the eyeball based on the computed feature amount.

7. The eyelid detection device of claim 5, wherein:
    the feature amount computation section shifts the second order edge image upwards in the blink direction and computes the feature amount for each of the pixels; and
    the eyelid detection section detects a boundary between the upper eyelid and the eyeball based on the computed feature amount.

8. The eyelid detection device of claim 1, wherein the feature amount computation section computes the feature amount for each of the pixels by taking a weighted sum or product of respective pixel values of the pixels in the first order edge image and respective pixel values of the pixels in the second order edge image.

9. The eyelid detection device of claim 1, wherein the eyelid detection section detects at least one of a boundary between the upper eyelid and the eyeball or a boundary between the lower eyelid and the eyeball based on a peak point in the specific direction of the computed feature amounts.

10. A non-transitory computer-readable storage medium that stores a program that causes a computer to function as:
    a generation section that, based on an image of an eye containing region, generates a first order edge image representing a magnitude of pixel value change in a specific direction for each pixel in the region, and generates a second order edge image representing a rate of change in the specific direction of the magnitude of pixel value change in the specific direction for each pixel in the region;
    a feature amount computation section that shifts the first order edge image or the second order edge image in the specific direction according to a cycle of a pixel value change frequency of an eyelid boundary in the image, and computes a feature amount for each pixel based on pixel values of the pixels in the first order edge image and pixel values of the pixels in the second order edge image; and an eyelid detection section that, based on the feature amount computed for each of the pixels, detects at least one of a boundary between an upper eyelid and an eyeball or.

11. The non-transitory computer-readable storage medium of claim 10, wherein the eyelid detection section, based on the feature amount computed for each of the pixels, detects at least one of a boundary between an upper eyelid and an eyeball or a boundary between a lower eyelid and the eyeball.

* * * * *